US008601305B2

(12) United States Patent
Lee

(10) Patent No.: US 8,601,305 B2
(45) Date of Patent: Dec. 3, 2013

(54) SYSTEM FOR SELECTIVELY POWER GATING FUNCTION BLOCKS HAVING A REGULATOR TO PROVIDE NORMAL OPERATION POWER AND A CURRENT LIMITER TO PROVIDE STANDBY POWER TO THE FUNCTION BLOCKS

(75) Inventor: Ki-Jong Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 12/856,967

(22) Filed: Aug. 16, 2010

(65) Prior Publication Data

US 2011/0047397 A1       Feb. 24, 2011

(30) Foreign Application Priority Data

Aug. 19, 2009   (KR) .................. 10-2009-0076508

(51) Int. Cl.
*G06F 1/00* (2006.01)
*G06F 11/00* (2006.01)

(52) U.S. Cl.
USPC ..................... 713/324; 713/322; 714/744

(58) Field of Classification Search
USPC ................... 713/324, 322; 714/744
See application file for complete search history.

(56) References Cited

U.S. PATENT DOCUMENTS

| 5,230,074 A * | 7/1993 | Canova et al. ............... 714/14 |
| 5,655,127 A * | 8/1997 | Rabe et al. .................. 713/322 |
| 2002/0053036 A1 * | 5/2002 | Kubota ........................ 713/300 |
| 2004/0088630 A1 * | 5/2004 | Arima et al. ................ 714/744 |
| 2005/0218952 A1 | 10/2005 | Padhye et al. |
| 2006/0282694 A1 * | 12/2006 | Ichikawa .................... 713/322 |
| 2010/0115323 A1 * | 5/2010 | Yamaguchi et al. ........ 713/400 |

FOREIGN PATENT DOCUMENTS

| KR | 100727414 B1 | 6/2007 |
| KR | 1020080014531 A | 2/2008 |
| KR | 1020080065121 A | 7/2008 |

* cited by examiner

*Primary Examiner* — Thomas Lee
*Assistant Examiner* — Terrell Johnson
(74) *Attorney, Agent, or Firm* — Myers Bigel Sibley & Sajovec, P.A.

(57) ABSTRACT

A power gating device may include a control unit that generates a first interrupt signal based on a mode change signal when a mode of a system is changed from a normal operation mode to a stand-by mode, and generates a second interrupt signal based on the mode change signal when the mode is changed from the stand-by mode to the normal operation mode, a memory unit that stores data of a function block based on the first interrupt signal, and restores the stored data to the function block based on the second interrupt signal, and a power source unit that provides a normal operation power to the function block and the memory unit based on a power down signal in the normal operation mode, and provides a stand-by power to the memory unit based on the power down signal in the stand-by mode.

15 Claims, 13 Drawing Sheets

SYSTEM FOR SELECTIVELY POWER GATING FUNCTION BLOCKS HAVING A REGULATOR TO PROVIDE NORMAL OPERATION POWER AND A CURRENT LIMITER TO PROVIDE STANDBY POWER TO THE FUNCTION BLOCKS

CROSS-REFERENCE TO RELATED APPLICATION(S)

This application claims priority under 35 USC §119 to Korean Patent Application No. 10-2009-0076508, filed on Aug. 19, 2009, in the Korean Intellectual Property Office (KIPO), the contents of which are incorporated herein in its entirety by reference.

BACKGROUND

1. Technical Field

Example embodiments relate to a power gating device, and more particularly to a power gating device that is applicable to a system-on-chip (SOC) system.

2. Description of the Related Art

Recently, a mobile electric device is manufactured as a SOC system in which various circuits are integrated in a single chip. Whereas the mobile electric device requires small size and light weight, the number of function blocks in the mobile electric device is increasing. Generally, since the mobile electric device operates based on a limited power (e.g., using an embedded battery), power consumption of the mobile electric device should be reduced by adopting a stand-by mode.

Conventional mobile electric devices may include a power gating device for preventing power from being provided to the function blocks in the stand-by mode. However, when power is blocked to the function blocks in the stand-by mode, data of the function blocks may be lost. Thus, conventional mobile electric device is required to provide a power to the function blocks for retaining data of the function blocks in the stand-by mode.

SUMMARY

Example embodiments provide a power gating device capable of reducing power consumption of function blocks in a stand-by mode of a system, and capable of retaining data of the function blocks in the stand-by mode without any additional device.

According to some example embodiments, a power gating device in a system including at least one function block may include a control unit that generates a first interrupt signal based on a mode change signal when a mode of the system is changed from a normal operation mode to a stand-by mode, and that generates a second interrupt signal based on the mode change signal when the mode of the system is changed from the stand-by mode to the normal operation mode, a memory unit that stores data of the function block based on the first interrupt signal, and that restores the stored data to the function block based on the second interrupt signal, and a power source unit that provides a normal operation power to the function block and the memory unit based on a power down signal in the normal operation mode, and that provides a stand-by power to the memory unit based on the power down signal in the stand-by mode.

In some embodiments, the system is implemented as a system-on-chip (SOC) system in which the power gating device and the function block are integrated.

In some embodiments, the control unit may generate the first interrupt signal responding to an activation of the mode change signal, and may generate the second interrupt signal responding to a deactivation of the mode change signal.

In some embodiments, the memory unit may store the data of the function block before the power down signal is activated when the mode of the system is changed from the normal operation mode to the stand-by mode.

In some embodiments, the memory unit may restore the stored data to the function block after the power down signal is deactivated when the mode of the system is changed from the stand-by mode to the normal operation mode.

In some embodiments, the power source unit may provide the stand-by power to the memory unit during an activated period of the power down signal.

In some embodiments, the function block may be controlled to be in a power-off state during the activated period of the power down signal, and the memory unit may be controlled to be in a semi-power-off state during the activated period of the power down signal.

In some embodiments, the memory unit may retain the stored data in the stand-by mode.

In some embodiments, the power source unit may provide the normal operation power to the function block and the memory unit during a deactivated period of the power down signal.

In some embodiments, the function block may be controlled to be in a power-on state during the deactivated period of the power down signal, and the memory unit may be controlled to be in the power-on state during the deactivated period of the power down signal.

According to some example embodiments, a power gating device in a system including a first function block and a second function block may include a control unit that generates a first interrupt signal based on a mode change signal when a mode of the system is changed from a normal operation mode to a stand-by mode, and that generates a second interrupt signal based on the mode change signal when the mode of the system is changed from the stand-by mode to the normal operation mode, a memory unit that stores data of a first function block based on the first interrupt signal, and that restores the stored data to the first function block based on the second interrupt signal, and a power source unit that provides a normal operation power to the first function block, a second function block, and the memory unit based on a power down signal in the normal operation mode, and that provides a stand-by power to the second function block and the memory unit based on the power down signal in the stand-by mode.

In some embodiments, the power source unit may include a regulator that provides the normal operation power to the first function block, the second function block, and the memory unit in the normal operation mode, and a current limiter that provides the stand-by power to the second function block and the memory unit in the stand-by mode.

In some embodiments, the regulator may include at least one first switch coupled between a power voltage and the first function block, at least one second switch coupled between the power voltage and the second function block, and an amplifier that turns on or off the first switch and the second switch based on the power down signal.

In some embodiments, the control unit may generate the first interrupt signal responding to an activation of the mode change signal, and may generate the second interrupt signal responding to a deactivation of the mode change signal.

In some embodiments, the memory unit may store the data of the first function block before the power down signal is activated when the mode of the system is changed from the normal operation mode to the stand-by mode. In addition, the memory unit may restore the stored data to the first function block after the power down signal is deactivated when the mode of the system is changed from the stand-by mode to the normal operation mode.

In some embodiments, the current limiter may provide the stand-by power to the second function block and the memory unit in the stand-by mode when the amplifier turns off the first switch and the second switch responding to an activation of the power down signal.

In some embodiments, the first function block may be controlled to be in a power-off state during an activated period of the power down signal, the second function block may be controlled to be in a semi-power-off state during the activated period of the power down signal, and the memory unit may be controlled to be in the semi-power-off state during the activated period of the power down signal.

In some embodiments, the second function block may retain data of the second function block in the stand-by mode, and the memory unit may retain the stored data in the stand-by mode.

In some embodiments, the regulator may provide the normal operation power to the first function block, the second function block, and the memory unit in the normal operation mode when the amplifier turns on the first switch and the second switch responding to a deactivation of the power down signal.

In some embodiments, the first function block may be controlled to be in a power-on state during the deactivated period of the power down signal, the second function block may be controlled to be in the power-on state during the deactivated period of the power down signal, and the memory unit may be controlled to be in the power-on state during the deactivated period of the power down signal.

According to some example embodiments, a power gating device may reduce power consumption of function blocks in a stand-by mode of a system, may retain data of the function blocks in the stand-by mode without any additional device such as a multi-threshold complementary metal-oxide semiconductor (MTCMOS) device that uses a footer and/or a header, a retention flip-flop, etc, and may prevent a power/ground bouncing phenomenon when a mode of the system is changed (e.g., from the stand-by mode to the normal operation mode).

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
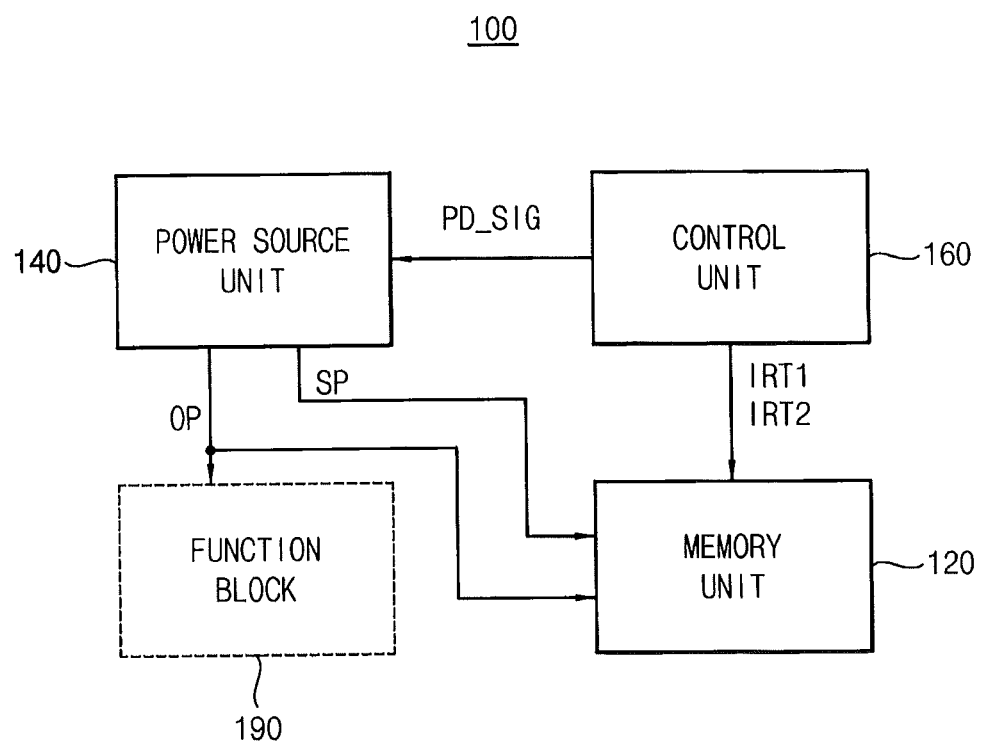
FIG. 1 is a block diagram illustrating a power gating device according to some example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a power gating device according to some example embodiments.

Referring to FIG. 1, the power gating device 100 may include a memory unit 120, a power source unit 140, and a control unit 160. The power gating device 100 is coupled to a function block 190 such that a power gating operation for the function block 190 may be performed. Although one function block is illustrated in FIG. 1, the number of function block is not limited thereto. Further, a system having the power gating device 100 may be a system-on-chip (SOC) system where the power gating device 100 is embedded with the function block 190 in one chip.

The memory unit 120 may include at least one memory device. The memory unit 120 may be provided with a normal operation power OP (i.e., a relatively high power) from the power source unit 140 in a normal operation mode of the system. Thus, the memory unit 120 may operate based on the normal operation power OP in the normal operation mode. The memory unit 120 may be provided with a stand-by power SP (i.e., a relatively low power) from the power source unit 140 in a stand-by mode of the system. Thus, the memory unit 120 may perform a data retention operation based on the stand-by power SP in the stand-by mode. That is, the memory unit 120 may be controlled to be in a power-on state when the system operates in the normal operation mode. On the other hand, the memory unit 120 may be controlled to be in a semi-power-off state when the system operates in the stand-by mode. In conventional system, a function block may be provided with neither the normal operation power OP nor the stand-by power SP in the stand-by mode. Thus, when the conventional system operates in the stand-by mode, the function block is controlled to be in a power-off state such that data of the function block may be lost. To overcome this problem, the memory unit 120 may store data of the function block 190 based on the normal operation power OP in the normal operation mode, may retain the data of the function block 190 based on the stand-by power SP in the stand-by mode, and may restore the stored data to the function block 190 based on the normal operation power OP in the normal operation mode. The memory unit 120 may be a non-volatile memory device such as a phase-change random access memory (PRAM) device, a flash memory device, a magnetic random access memory (MRAM) device, etc, a volatile memory device such as a dynamic random access memory (DRAM) device, a static random access memory (SRAM) device, etc, or combinations thereof. In an example embodiment, the memory unit 120 may be main memory devices of the system. The system may be a mobile electric device such as a laptop computer, a cellular phone, a MP3 player, etc.

The power source unit 140 may provide the normal operation power OP to the function block 190 and the memory unit 120 in the normal operation mode. Thus, the function block 190 and the memory unit 120 may operate normally. The power source unit 140 may not provide the normal operation power OP to the function block 190 and the memory unit 120 in the stand-by mode. Thus, power consumption of the function block 190 and the memory unit 120 may be reduced. If the memory unit 120 includes only a volatile memory device, the power source unit 140 may provide the stand-by power SP to the memory unit 120 in the stand-by mode. Thus, the volatile memory device in the memory unit 120 may retain the data of the function block 190. That is, by the power source unit 140, the function block 190 and the memory unit 120 may be controlled to be in the power-on state when the system operates in the normal operation mode, the function block 190 may be in the power-off state when the system operates in the stand-by mode, and the memory unit 120 may be in the semi-power-off state when the system operates in the stand-by mode. In an example embodiment, the power source unit 140 may include a regulator for providing the normal operation power OP to the function block 190 and the memory unit 120 in the normal operation mode, and a current limiter for providing the stand-by power SP to the memory unit 120 in the stand-by mode. For example, the regulator may be a main regulator of the system, and the current limiter may be a resistive element, or a diode element.

The control unit 160 may control the mode change of the system from the normal operation mode to the stand-by mode or from the stand-by mode to the normal operation mode. In addition, the control unit 160 may control the power gating operation for the function block 190 and the memory unit 120. When the mode of the system is changed from the normal operation mode to the stand-by mode, the control unit 160 may copy the data of the function block 190 to the memory unit 120 before the mode of the system is changed from the normal operation mode to the stand-by mode. When the mode of the system is changed from the stand-by mode to the normal operation mode, the control unit 160 may copy the data of the function block 190 stored in the memory unit 120 to the function block 190 after the mode of the system is changed from the stand-by mode to the normal operation mode. For example, the control unit 160 may be a central processing unit (CPU) of the system, or a state machine (SM) of the system. In an example embodiment, the control unit 160 may control the mode change of the system based on a mode change signal. The mode change signal may be a signal provided through a stand-by pin, or a signal provided from a mode set register. Here, the normal operation mode may correspond to a deactivated period of a power down signal PD_SIG, and the stand-by mode may correspond to an activated period of the power down signal PD_SIG.

In some embodiments, the control unit 160 may generate a first interrupt signal IRT1 responding to an activation of the mode change signal when the mode of the system is changed from the normal operation mode to the stand-by mode, and generate a second interrupt signal IRT2 responding to an deactivation of the mode change signal when the mode of the system is changed from the stand-by mode to the normal operation mode. The memory unit 120 may store the data of the function block 190 based on the first interrupt signal IRT1 before an activation of the power down signal PD_SIG when the mode of the system is changed from the normal operation mode to the stand-by mode, and may restore the stored data to the function block 190 based on the second interrupt signal IRT2 after a deactivation of the power down signal PD_SIG when the mode of the system is changed from the stand-by mode to the normal operation mode. The power source unit 140 may provide the stand-by power SP to the memory unit 120 during the activated period of the power down signal PD_SIG (i.e., in the stand-by mode), and may provide the normal operation power OP to the function block 190 and the memory unit 120 during the deactivated period of the power down signal PD_SIG (i.e., in the normal operation mode). In an example embodiment, the function block 190 may include at least one register (e.g., at least one flip-flop), and the data of the function block 190 may be data latched by the register (e.g., the flip-flop) in the function block 190.

As described above, the power gating device 100 may prevent the data of the function block 190 from being lost by storing the data of the function block 190 in the memory unit 120 before the mode of the system is changed from the normal operation mode to the stand-by mode, by retaining the data stored in the memory unit 120 in the stand-by mode, and by restoring the data stored in the memory unit 120 to the function block 190 after the mode of the system is changed from the stand-by mode to the normal operation mode. As a result, the function block 190 may operate continuously even though the mode of the system is changed. In addition, the power gating device 100 may reduce power consumption of the function block 190 and the memory unit 120 by controlling the function block 190 and the memory unit to be in the power-off state and in the semi-power-off state, respectively when the system operates in the stand-by mode. Further, the power gating device 100 may prevent a power/ground bouncing phenomenon when the mode of the system is changed (e.g., from the stand-by mode to the normal operation mode) because the power gating device 100 retains the data of the function block 190 in the stand-by mode without any additional device such as a MTCMOS device that uses a footer and/or a header, a retention flip-flop, etc.

Figure 2:
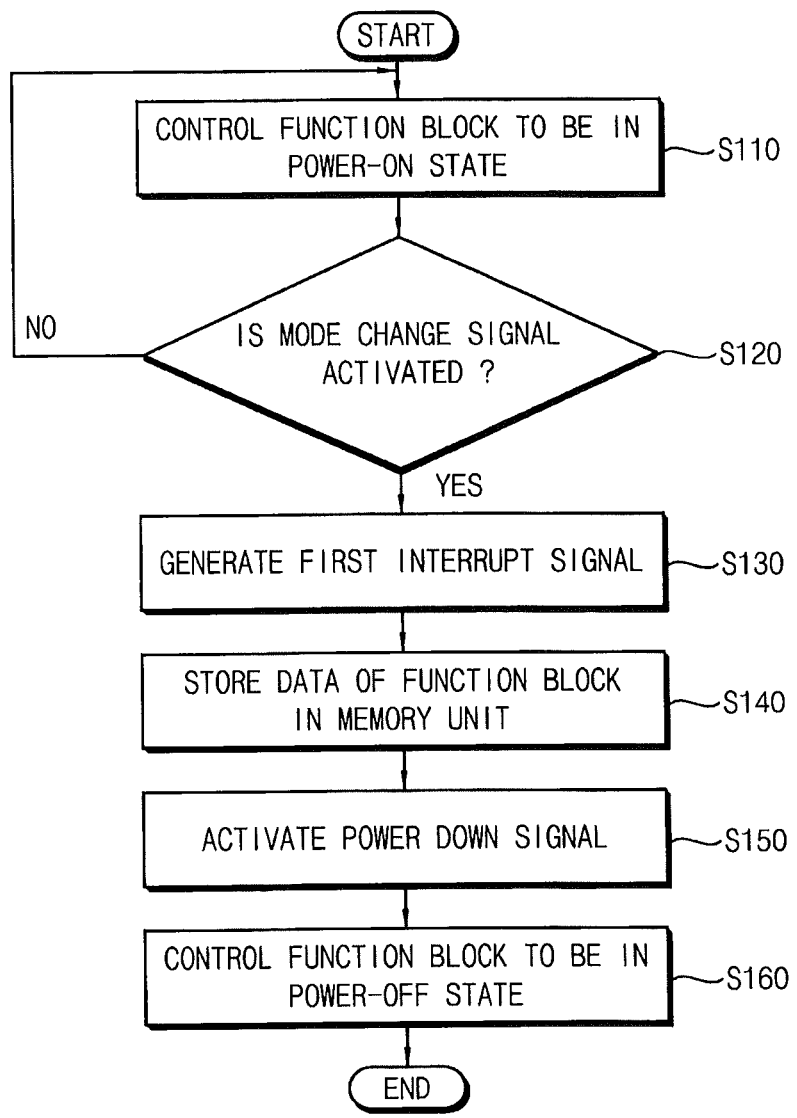
FIG. 2 is a flow chart illustrating a mode change operation from a normal operation mode to a stand-by mode in a power gating device of FIG. 1.

FIG. 2 is a flow chart illustrating a mode change operation from a normal operation mode to a stand-by mode in a power gating device of FIG. 1.

Referring to FIG. 2, in the normal operation mode of the system, the power gating device 100 may control the function block 190 to be in the power-on state (Step S110), and may check whether the mode change signal is activated (Step S120). The mode change signal may be a signal provided through the stand-by pin, or a signal provided from a mode set register. The power gating device 100 may generate the first interrupt signal IRT1 based on the activation of the mode change signal (Step S130), and may store the data of the function block 190 in the memory unit 120 based on the first interrupt signal IRT1 (Step S140). Then, the power gating device 100 may control the function block 190 to be in the power-off state (Step S160) when the power down signal PD_SIG is activated (Step S150). As described above, the power gating device 100 may reduce power consumption of the function block 190 and the memory unit 120 in the stand-by mode by providing the function block 190 with neither the normal operation power OP (i.e., the relatively high power) nor the stand-by power SP (i.e., the relatively low power), and by providing the memory unit 120 with the stand-by power SP. In addition, the power gating device 100 may prevent the data of the function block 190 from being lost in the stand-by mode by storing the data of the function block 190 in the memory unit 120 before the mode of the system is changed from the normal operation mode to the stand-by mode, by retaining the data stored in the memory unit 120 in the stand-by mode, and by restoring the data stored in the memory unit 120 to the function block 190 after the mode of the system is changed from the stand-by mode to the normal operation mode.

Figure 3:
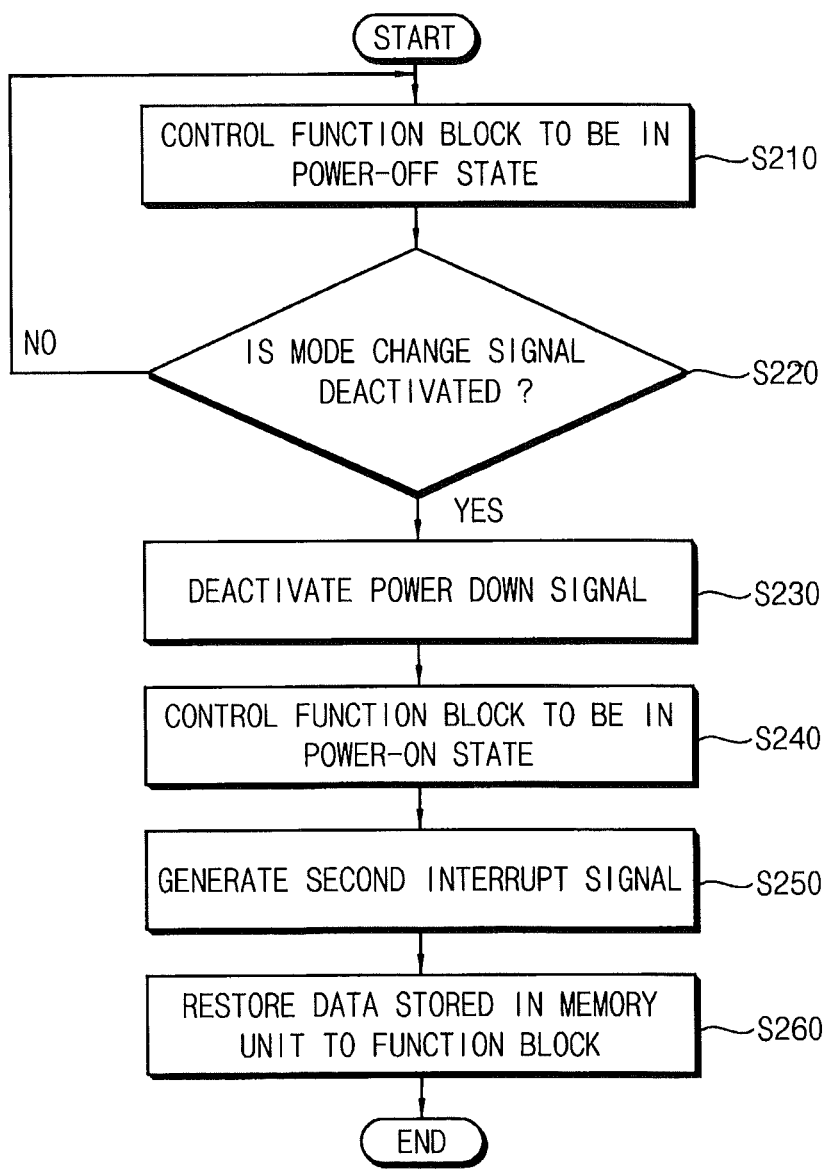
FIG. 3 is a flow chart illustrating a mode change operation from a stand-by mode to a normal operation mode in a power gating device of FIG. 1.

FIG. 3 is a flow chart illustrating a mode change operation from a stand-by mode to a normal operation mode in a power gating device of FIG. 1.

Referring to FIG. 3, in the stand-by mode of the system, the power gating device 100 may control the function block 190 to be in the power-off state (Step S210), and may check whether the mode change signal is deactivated (Step S220). The mode change signal may be the signal provided through the stand-by pin, or the signal provided from the mode set register. The power gating device 100 may control the function block 190 to be in the power-on state (Step S240) when the power down signal PD_SIG is deactivated (Step S230) responding to the deactivation of the mode change signal. As a result, the function block 190 may operate normally because the function block 190 is provided with the normal operation power OP (i.e., the relatively high power), and the memory unit 120 may operate normally because the memory unit 120 is provided with the normal operation power OP. Then, the power gating device 100 may generate the second interrupt signal IRT2 based on the deactivation of the mode change signal (Step S250), and may restore the data stored in the memory unit 120 to the function block 190 based on the second interrupt signal IRT2 (Step S260). As described above, the power gating device 100 may prevent the data of the function block 190 from being lost in the stand-by mode by storing data of the function block 190 in the memory unit 120 before the mode of the system is changed from the normal operation mode to the stand-by mode, by retaining the data stored in the memory unit 120 in the stand-by mode, and by restoring the data stored in the memory unit 120 to the function block 190 after the mode of the system is changed from the stand-by mode to the normal operation mode. Since the mode change operation of the power gating device 100 illustrated in FIG. 3 is an example embodiment, the mode change operation of the power gating device 100 is not limited thereto.

Figure 4:
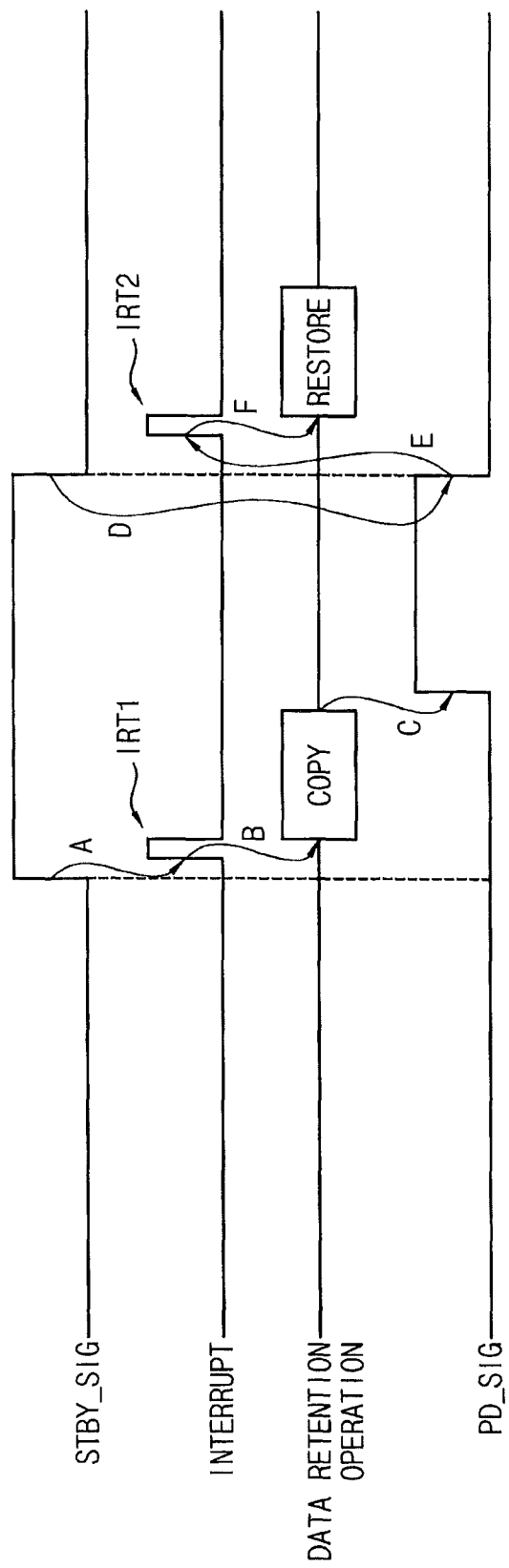
FIG. 4 is a timing diagram illustrating a data retention operation in a power gating device of FIG. 1.

FIG. 4 is a timing diagram illustrating a data retention operation in a power gating device of FIG. 1.

Referring to FIG. 4, the activated period of the power down signal PD_SIG may correspond to the stand-by mode of the system, and the deactivated period of the power down signal PD_SIG may correspond to the normal operation mode of the system. That is, the power down signal PD_SIG may be in a deactivated state when the system operates in the normal operation mode, and the power down signal PD_SIG may be in an activated state when the system operates in the stand-by mode. The power gating device 100 may copy the data of the function block 190 to the memory unit 120 based on the first interrupt signal IRT1 (i.e., denoted as B) when the first interrupt signal IRT1 is generated responding to the activation of the mode change signal STBY_SIG (i.e., denoted as A). In addition, the power gating device 100 may control the system to operate in the stand-by mode by activating the power down signal PD_SIG (i.e., denoted as C) after the data of the function block 190 is copied to the memory unit 120 (i.e., denoted as B). Then, the power gating device 100 may generate the second interrupt signal IRT2 (i.e., denoted as E) after the power down signal PD_SIG is deactivated (i.e., denoted as E) responding to the deactivation of the mode change signal STBY_SIG (i.e., denoted as D). The power gating device 100 may copy the data stored in the memory unit 120 to the function block 190 based on the second interrupt signal IRT2 (i.e., denoted as F).

Figure 5:
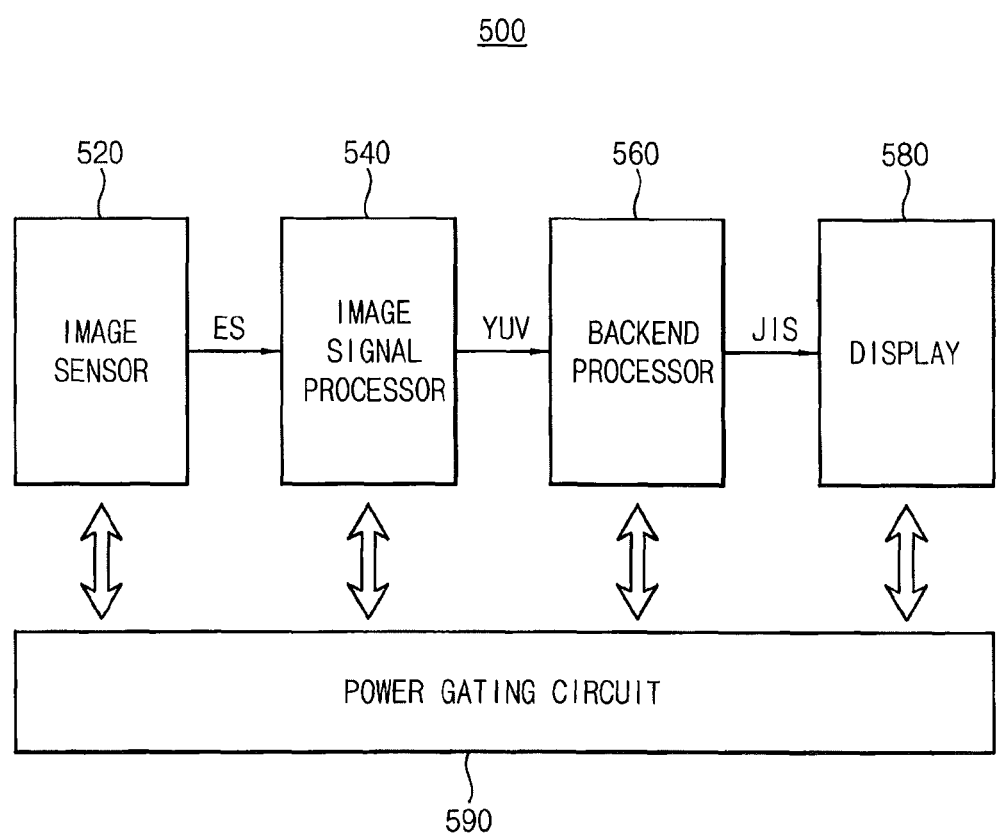
FIG. 5 is a block diagram illustrating an image sensing system having a power gating device of FIG. 1.

FIG. 5 is a block diagram illustrating an image sensing system having a power gating device of FIG. 1.

Referring to FIG. 5, the image sensing system 500 may include an image sensor 520, an image signal processor 540, a backend processor 560, a display 580, and a power gating circuit 590. The power gating circuit 590 may correspond to the power gating device 100 of FIG. 1. The power gating circuit 590 may perform a power gating operation for the image sensor 520, the image signal processor 540, the backend processor 560, and the display 580 in the image sensing system 500. Thus, the image sensor 520, the image signal processor 540, the backend processor 560, and the display 580 may be provided with the normal operation power OP (i.e., the high power) and/or the stand-by power SP (i.e., the low power) by the power gating circuit 590 depending on the mode of the system 500.

The image sensor 520 may transform light to electric charges, may accumulate the electric charges, and may output an electric signal ES corresponding to the accumulated electric charges. In an example embodiment, the image sensor 520 may be a charge coupled device (CCD) image sensor, or a complementary metal-oxide semiconductor (CMOS) image sensor. The image signal processor 540 may convert the electric signal ES to an image signal YUV, and may provide the image signal YUV to the backend processor 560. For example, the electric signal ES may be a Bayer signal and the image signal YUV may be an RGB signal. The backend processor 560 may convert the image signal YUV to a joint photographic experts group (JPEG) format image JIS using a predetermined encoding method, and may provide the JPEG format image JIS to the display 580. The display 580 may display the JPEG format image JIS on a display panel. The image sensing system 500 may further include at least one memory device to store the JPEG format image generated by the backend processor 560.

The power gating circuit 590 may perform the power gating operation for the image sensor 520, the image signal processor 540, the backend processor 560, and the display 580 in the image sensing system 500. That is, the power gating circuit 590 may provide the normal operation power OP and/or the stand-by power SP to the image sensor 520, the image signal processor 540, the backend processor 560, and the display 580 based on the mode of the image sensing system 500. For this operation, the power gating circuit 590 may include the memory unit 120, the power source unit 140, and the control unit 160. Since the operation of the memory unit 120, the power source unit 140, and the control unit 160 are described in FIG. 1, the description of the memory unit 120, the power source unit 140, and the control unit 160 will be omitted. In an example embodiment, the image sensing system 500 may be manufactured as a SOC system. Thus, the image sensor 520, the image signal processor 540, the backend processor 560, the display 580, and the power gating circuit 580 may be embedded in one chip.

Figure 6:
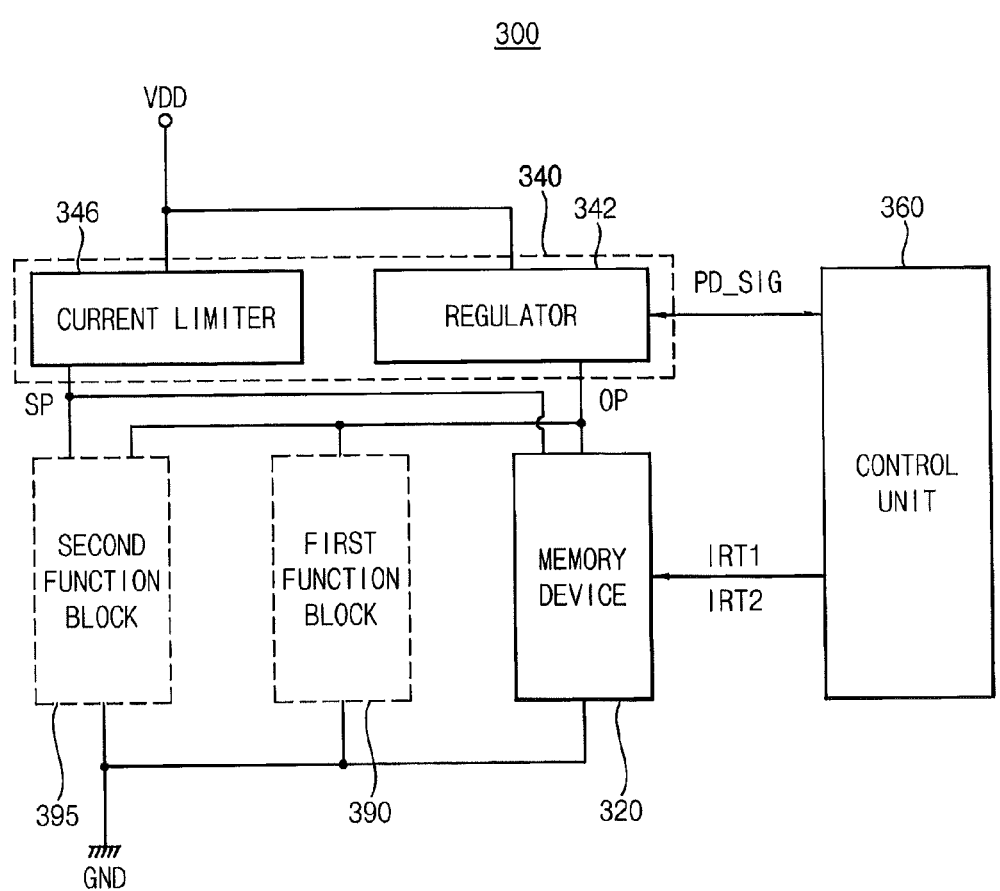
FIG. 6 is a block diagram illustrating a power gating device according to some example embodiments.

FIG. 6 is a block diagram illustrating a power gating device according to some example embodiments.

Referring to FIG. 6, the power gating device 300 may include a memory unit 320, a power source unit 340, and a control unit 360. The power source unit 340 may include a regulator 342 and a current limiter 346. The power gating device 300 may be coupled to a first function block 390 and a second function block 395. Further, a system having the power gating device 300 may be a SOC system where the power gating device 300 is embedded with the first function block 390 and the second function block 395 in one chip.

Each of the first function block 390 and the second function block 395 may include at least one logic circuit for performing logic operations, and at least one register for latching data output from the logic circuit. When the system operates in a stand-by mode, a normal operation power OP (i.e., a high power) may not be provided to the first function block 390 and the second function block 395. Here, a stand-by power SP (i.e., a low power) may be provided to the second function block 395. Thus, data of the second function block 395 may not be lost because the second function block 395 operates based on the stand-by power SP. On the other hand, when the system operates in the stand-by mode, the stand-by power SP as well as the normal operation power OP may not be provided to the first function block 390. Thus, the first function block 390 can not operate to retain data of the first function block 390. Nevertheless, the data of the first function block 390 may not be lost because the data of the first function block 390 is retained by the memory unit 320. Thus, the first function block 390 and the second function block 395 may not need any data retention register such as a retention flip-flop, etc. That is, the register in the first function block 390 and the register in the second function block 395 may be a normal flip-flop having no data retention function.

The normal flip-flop may include a master latch unit, a slave latch unit, and a clock signal generation unit. The clock signal generation unit may provide internal clock signals to logic elements of the master latch unit and the slave latch unit. The master latch unit may latch data input from outside. The slave latch unit may receive a previous logic state, and may output the previous logic state. Although two function blocks are illustrated in FIG. 6, the number of function block is not limited thereto. In an example embodiment, the power gating device 300 may be coupled to a plurality of first function blocks 390 and a plurality of second function blocks 395. Here, the first function blocks 390 may be understood as function blocks that are controlled to be in a power-off state when the system operates in the stand-by mode. Thus, the stand-by power SP as well as the normal operation power OP may not be provided to the first function blocks 390. On the other hand, the second function blocks 395 may be understood as function blocks that are controlled to be in a semi-power-off state when the system operates in the stand-by mode. Thus, the stand-by power SP may be provided to the second function blocks 395.

The memory unit 320 may include at least one memory device. The memory unit 320 may be provided with the normal operation power OP by the regulator 342 of the power source unit 340 in the normal operation mode. Thus, the memory unit 320 may operate based on the normal operation power OP in the normal operation mode. In addition, the memory unit 320 may be provided with the stand-by power SP by the current limiter 346 of the power source unit 340 in the stand-by mode. Thus, the memory unit 320 may perform a data retention operation in the stand-by mode. That is, the memory unit 320 may be controlled to be in the power-on state when the system operates in the normal operation mode, and the memory unit 320 may be controlled to be in the semi-power-off state when the system operates in the stand-by mode. In conventional system, a function block may be provided with neither the normal operation power OP nor the stand-by power SP in the stand-by mode. Thus, when the conventional system operates in the stand-by mode, the function block is controlled to be in the power-off state such that data of the function block may be lost. To overcome this problem, the memory unit 320 may store data of the first function block 390 based on the normal operation power OP in the normal operation mode, may retain the data of the first function block 390 based on the stand-by power SP in the stand-by mode, and may restore the stored data to the first function block 390 based on the normal operation power OP in the normal operation mode. The memory unit 320 may be a non-volatile memory device such as a PRAM device, a flash memory device, a MRAM device, etc, a volatile memory device such as a DRAM device, a SRAM device, etc, or combinations thereof. In an example embodiment, the memory unit 320 may be main memory devices of the system. The system may be a mobile electric device such as a laptop computer, a cellular phone, a MP3 player, etc.

The regulator 342 of the power source unit 340 may provide the normal operation power OP to the first function block 390, the second function block 395, and the memory unit 320 in the normal operation mode. Thus, the first function block 390, the second function block 395, and the memory unit 320 may operate normally. The regulator 342 of the power source unit 340 may not provide the normal operation power OP to the first function block 390, the second function block 395, and the memory unit 320 in the stand-by mode. Thus, power consumption of the first function block 390, the second function block 395, and the memory unit 320 may be reduced. The regulator 342 of the power source unit 340 may include at least one first switch coupled between a power voltage VDD and the first function block 390, at least one second switch coupled between the power voltage VDD and the second function block 395, and an amplifier that turns on/off the first switch and the second switch based on a power down signal PD_SIG. For example, the amplifier may turn off the first switch and the second switch responding to an activation of the power down signal PD_SIG, and may turn on the first switch and the second switch responding to a deactivation of the power down signal PD_SIG.

The current limiter 346 of the power source unit 340 may provide the stand-by power SP to the second function block 395 and the memory unit 320 in the stand-by mode. Thus, the second function block 395 and the memory unit 320 may be controlled to be in the semi-power-off state when the system operates in the stand-by mode. Thus, the data of the second function block 395 may be retained without copying the data of the second function block 395 to the memory unit 320 because the second function block 395 operates based on the stand-by power SP. In addition, the data of the first function block 390 may be retained by copying the data of the first function block 390 to the memory unit 320 because the memory unit 320 operates based on the stand-by power SP. In an example embodiment, the regulator 342 of the power source unit 340 may be a main regulator used in the system, and the current limiter 346 of the power source unit 340 may be a resistive element, or a diode element. A level of the stand-by power SP provided to the second function block 395 and the memory unit 320 may be subject to characteristics of the current limiter 346 of the power source unit 340 (e.g., type, size, etc). In conclusion, the power source unit 340 may provide the normal operation power OP to the first function block 390, the second function block 395, and the memory unit 320 in the normal operation mode, and may provide the stand-by power SP to the second function block 395 and the memory unit 320 in the stand-by mode.

The control unit 360 may control the mode change of the system from the normal operation mode to the stand-by mode or from the stand-by mode to the normal operation mode. In addition, the control unit 360 may control the power gating operation for the first function block 390, the second function block 395, and the memory unit 320. When the mode of the system is changed from the normal operation mode to the stand-by mode, the control unit 360 may copy the data of the first function block 390 to the memory unit 320 before the mode of the system is changed from the normal operation mode to the stand-by mode. When the mode of the system is changed from the stand-by mode to the normal operation mode, the control unit 360 may copy the data of the first function block 390 stored in the memory unit 320 to the first function block 390 after the mode of the system is changed from the stand-by mode to the normal operation mode. For example, the control unit 360 may be a CPU of the system, or a SM of the system. In an example embodiment, the control unit 360 may control the mode change of the system based on a mode change signal. The mode change signal may be a signal provided through a stand-by pin, or a signal provided from a mode set register. Here, the normal operation mode may correspond to a deactivated period of the power down signal PD_SIG, and the stand-by mode may correspond to an activated period of the power down signal PD_SIG.

In some embodiments, the control unit 360 may generate a first interrupt signal IRT1 responding to an activation of the mode change signal when the mode of the system is changed from the normal operation mode to the stand-by mode, and generate a second interrupt signal IRT2 responding to an deactivation of the mode change signal when the mode of the system is changed from the stand-by mode to the normal operation mode. The memory unit 320 may store the data of the first function block 390 based on the first interrupt signal IRT1 before the activation of the power down signal PD_SIG when the mode of the system is changed from the normal operation mode to the stand-by mode, and may restore the stored data to the first function block 390 based on the second interrupt signal IRT2 after the deactivation of the power down signal PD_SIG when the mode of the system is changed from the stand-by mode to the normal operation mode. The current limiter 346 of the power source unit 340 may provide the stand-by power SP to the memory unit 320 and the second function block 395 during the activated period of the power down signal PD_SIG (i.e., in the stand-by mode), and may provide the normal operation power OP to the first function block 390, the second function block 395, and the memory unit 320 during the deactivated period of the power down signal PD_SIG (i.e., in the normal operation mode). In an example embodiment, each of the first function block 390 and the second function block 395 may include at least one register (e.g., at least one flip-flop), and the data of the first function block 390 and the second function block 395 may be data latched by the register (e.g., the flip-flop) in the first function block 390 and the second function block 395, respectively.

As described above, the power gating device 300 may prevent the data of the first function block 390 from being lost by storing the data of the first function block 390 in the memory unit 320 before the mode of the system is changed from the normal operation mode to the stand-by mode, by retaining the data stored in the memory unit 320 in the stand-by mode, and by restoring the data stored in the memory unit 320 to the first function block 390 after the mode of the system is changed from the stand-by mode to the normal operation mode. In addition, the power gating device 300 may prevent the data of the second function block 395 from being lost by providing the stand-by power SP to the second function block 395 in the stand-by mode. As a result, the first function block 390 and the second function block 395 may operate continuously even though the mode of the system is changed. In addition, the power gating device 300 may reduce power consumption of the first function block 390, the second function block 395, and the memory unit 320 by controlling the first function block 390 to be in the power-off state, and the second function block 395 and the memory unit 320 to be in the semi-power-off state when the system operates in the stand-by mode. Further, the power gating device 300 may prevent a power/ground bouncing phenomenon when the mode of the system is changed (e.g., from the stand-by mode to the normal operation mode) because the power gating device 300 retains the data of the first function block 390 and the second function block 395 in the stand-by mode without any additional device such as a MTCMOS device that uses a footer and/or a header, a retention flip-flop, etc.

Figure 7:
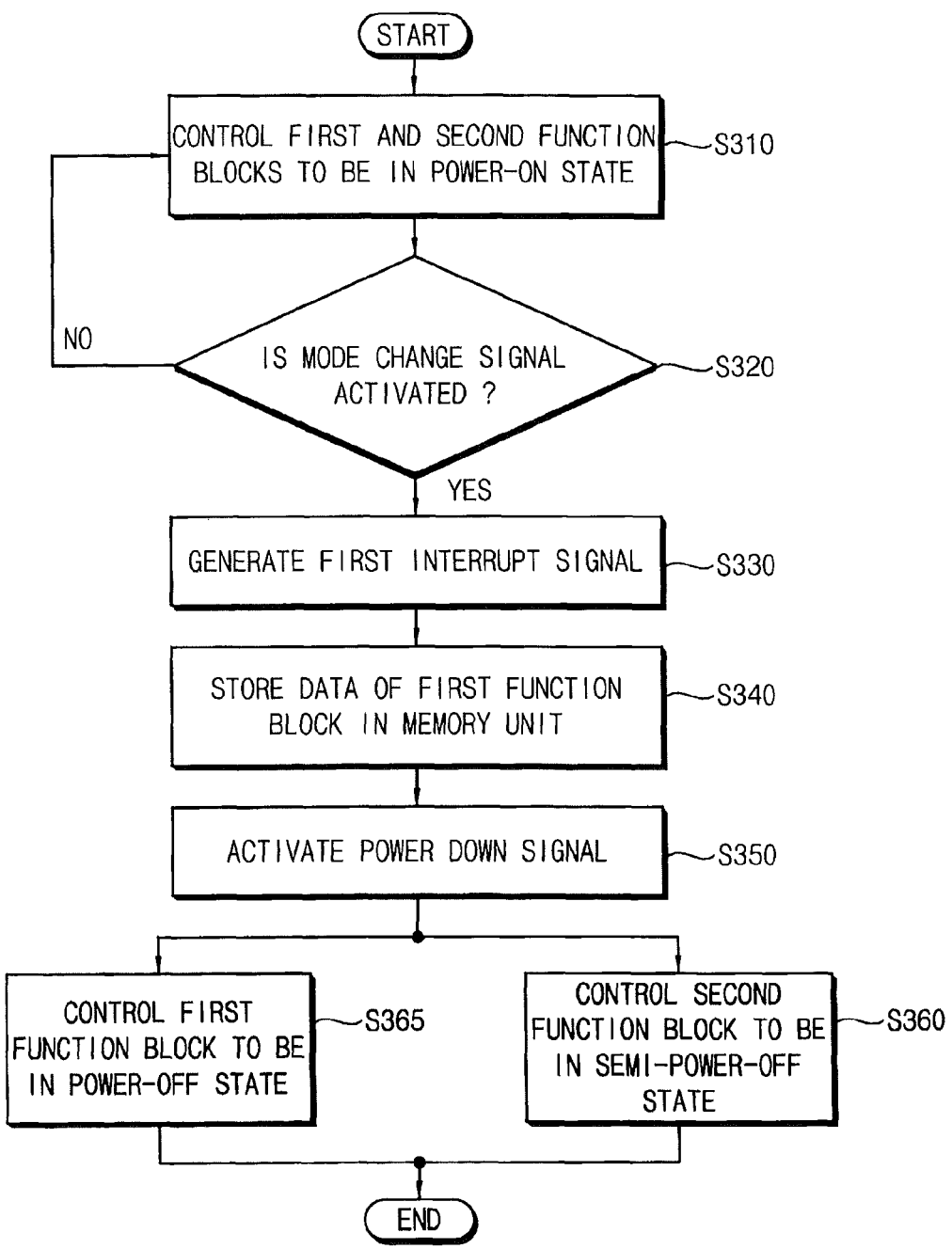
FIG. 7 is a flow chart illustrating a mode change operation from a normal operation mode to a stand-by mode in a power gating device of FIG. 6.

FIG. 7 is a flow chart illustrating a mode change operation from a normal operation mode to a stand-by mode in a power gating device of FIG. 6.

Referring to FIG. 7, in the normal operation mode of the system, the power gating device 300 may control the first function block 390 and the second function block 395 to be in the power-on state (Step S310), and may check whether the mode change signal is activated (Step S320). The mode change signal may be a signal provided through the stand-by pin, or a signal provided from the mode set register. The power gating device 300 may generate the first interrupt signal IRT1 based on the activation of the mode change signal (Step S330), and may store the data of the first function block 390 in the memory unit 320 based on the first interrupt signal IRT1 (Step S340). Then, the power gating device 300 may control the first function block 390 to be in the power-off state (Step S365), and may control the second function block 395 to be in the semi-power-off state (Step S360) when the power down signal PD_SIG is activated (Step S350). As described above, the power gating device 300 may reduce power consumption of the first function block 390, the second function block 395, and the memory unit 320 in the stand-by mode by providing the first function block 390 with neither the normal operation power OP (i.e., the relatively high power) nor the stand-by power SP (i.e., the relatively low power), and by providing the second function block 395 and the memory unit 320 with the stand-by power SP. In addition, the power gating device 300 may prevent the data of the first function block 390 from being lost in the stand-by mode by storing the data of the first function block 390 in the memory unit 320 before the mode of the system is changed from the normal operation mode to the stand-by mode, by retaining the data stored in the memory unit 320 in the stand-by mode, and by restoring the data stored in the memory unit 320 to the first function block 390 after the mode of the system is changed from the stand-by mode to the normal operation mode. Further, the power gating device 300 may prevent the data of the second function block 395 from being lost by providing the stand-by power SP to the second function block 395 in the stand-by mode.

Figure 8:
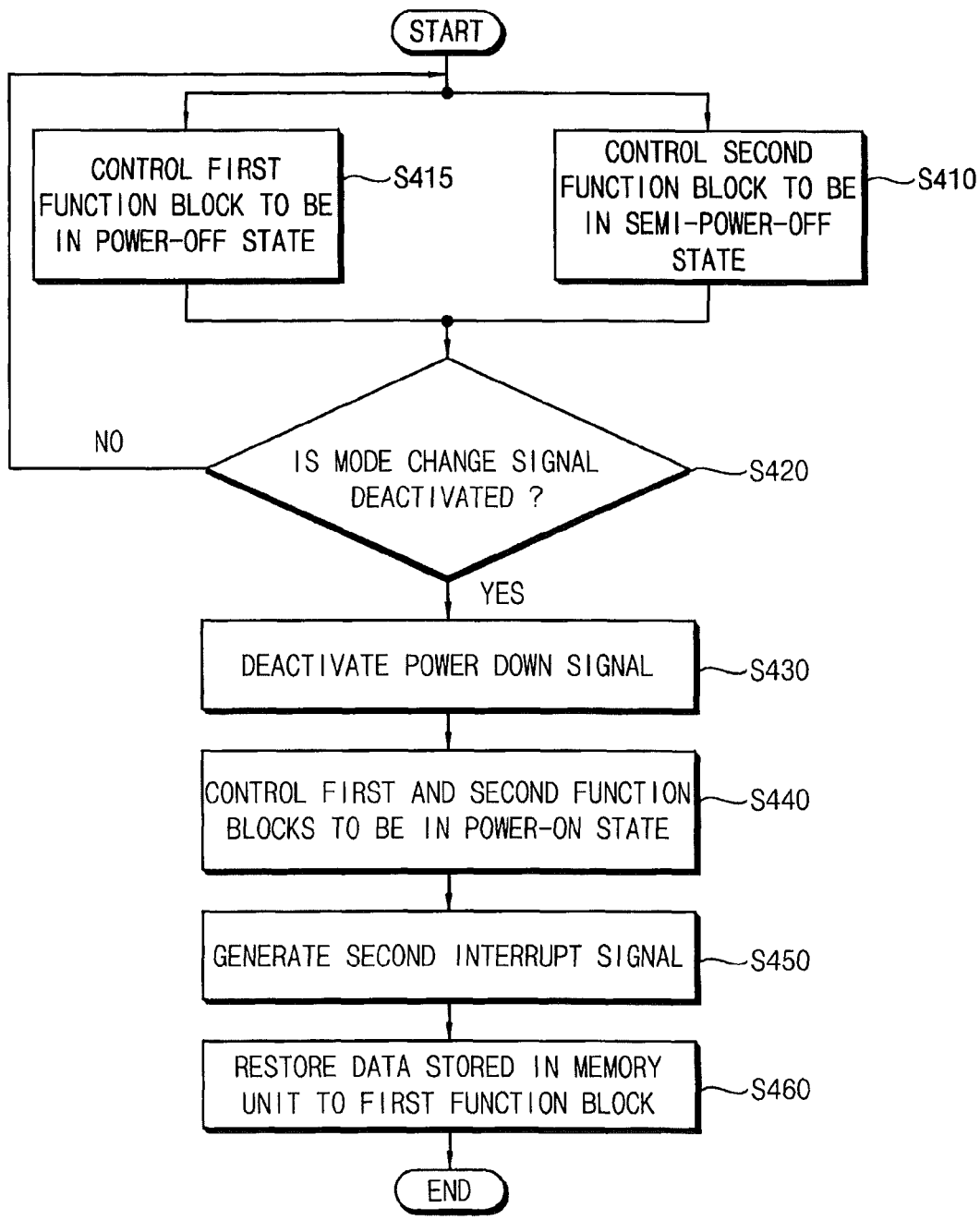
FIG. 8 is a flow chart illustrating a mode change operation from a stand-by mode to a normal operation mode in a power gating device of FIG. 6.

FIG. 8 is a flow chart illustrating a mode change operation from a stand-by mode to a normal operation mode in a power gating device of FIG. 6.

Referring to FIG. 8, in the stand-by mode of the system, the power gating device 300 may control the first function block 390 to be in the power-off state (Step S415), may control the second function block 395 to be in the semi-power-off state (Step S410), and may check whether the mode change signal is deactivated (Step S420). The mode change signal may be the signal provided through the stand-by pin, or the signal provided from the mode set register. The power gating device 300 may control the first function block 390 ant the second function block 395 to be in the power-on state (Step S440) when the power down signal PD_SIG is deactivated (Step S430) responding on the deactivation of the mode change signal. As a result, the first function block 390 and the second function block 395 may operate normally because the first function block 390 and the second function block 395 are provided with the normal operation power OP. In addition, the memory unit 320 may operate normally because the memory unit 320 is provided with the normal operation power OP. Then, the power gating device 300 may generate the second interrupt signal IRT2 based on the deactivation of the mode change signal (Step S450), and may restore the data stored in the memory unit 320 to the first function block 390 based on the second interrupt signal IRT2 (Step S460). As described above, the power gating device 300 may prevent the data of the first function block 390 from being lost in the stand-by mode by storing the data of the first function block 390 in the memory unit 320 before the mode of the system is changed from the normal operation mode to the stand-by mode, by retaining the data stored in the memory unit 320 in the stand-by mode, and by restoring the data stored in the memory unit 320 to the first function block 390 after the mode of the system is changed from the stand-by mode to the normal operation mode. In addition, the power gating device 300 may prevent the data of the second function block 395 from being lost by providing the stand-by power SP to the second function block 395 in the stand-by mode. Since the mode change operation of the power gating device 300 illustrated in FIG. 8 is an example embodiment, the mode change operation of the power gating device 300 is not limited thereto.

FIGS. 9A through 9E are block diagrams illustrating an operation of a power gating device of FIG. 6.

Referring to FIGS. 9A through 9E, the power source unit 340 may include the regulator 342 and the current limiter 346. The first function block 390 and the second function block 395 may include a register 390 and a logic circuit 391. In an example embodiment, the regulator 342 may be coupled between the power voltage VDD and main circuits (i.e., the first function block 390, the second function block 395, and the memory unit 320). The regulator 342 may include a first switch 343, a second switch 344, and an amplifier 345. The first switch 343 may be coupled between the power voltage VDD and the first function block 390. The second switch 344 may be coupled between the power voltage VDD and the second function block 395, and between the power voltage VDD and the memory device 320. The amplifier 345 may receive the power down signal PD_SIG, and may turn on/off the first switch 343 and the second switch 344 based on the power down signal PD_SIG. The current limiter 346 may be coupled between the power voltage VDD and the second function block 395, and between the power voltage VDD and the memory unit 320. In an example embodiment, the current limiter 347 may be a diode element. The first function block 390 may be coupled between the regulator 342 and the ground voltage GND. The first function block 390 may include the logic circuit 391 and the register 392. The logic circuit 391 and the register 392 of the first function block 390 may be coupled between the first switch 343 and the ground voltage GND. The second function block 395 may be coupled between the regulator 342 and the ground voltage GND, and between the current limiter 346 and the ground voltage GND. The second function block 395 may include a logic circuit (not illustrated) and a register (not illustrated). The logic circuit and the register of the second function block 395 may be coupled between the second switch 344 and the ground voltage GND.

Figure 9A:
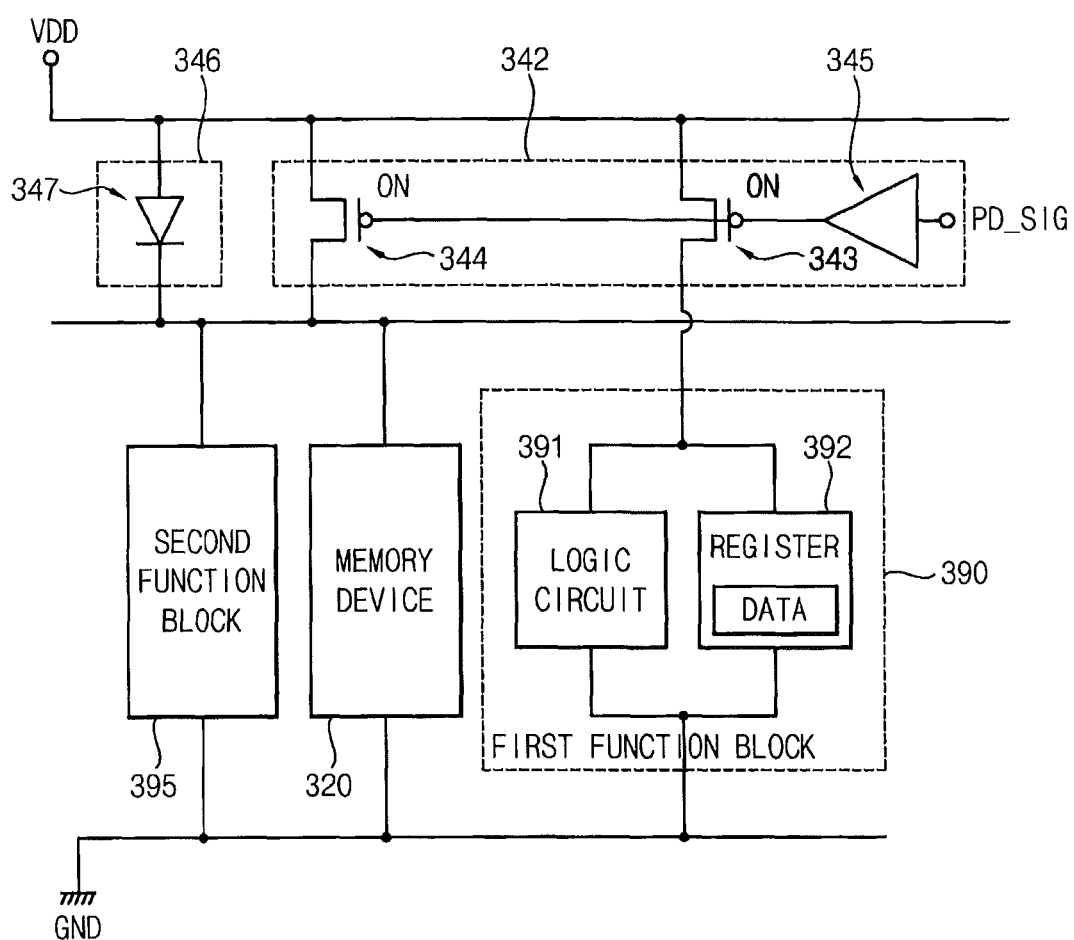
FIGS. 9A through 9E are block diagrams illustrating an operation of a power gating device of FIG. 6.

Referring to FIG. 9A, the first switch 343 and the second switch 344 in the regulator 342 may turn on based on an output of the amplifier 345 in the normal operation mode. In an example embodiment, the first switch 343 and the second switch 344 may be implemented by a p-type metal-oxide semiconductor (PMOS) transistor. That is, since the power down signal PD_SIG is deactivated to have a voltage level of logic "LOW", the output of the amplifier 345 may have a voltage level of logic "LOW". As a result, the first switch 343 and the second switch 344 as the PMOS transistor receive a voltage level of logic "LOW" through their gate terminals in the normal operation mode such that the first switch 343 and the second switch 344 may turn on. As described above, the first function block 390, the second function block 395, and the memory unit 320 may operate normally because the first function block 390, the second function block 395, and the memory unit 320 are provided with the normal operation power OP corresponding to the power voltage VDD. For example, in the first function block 390, the logic circuit 391 may perform a logic operation to generate data DATA, and the register 392 may latch the data DATA output from the logic circuit 391.

Figure 9B:
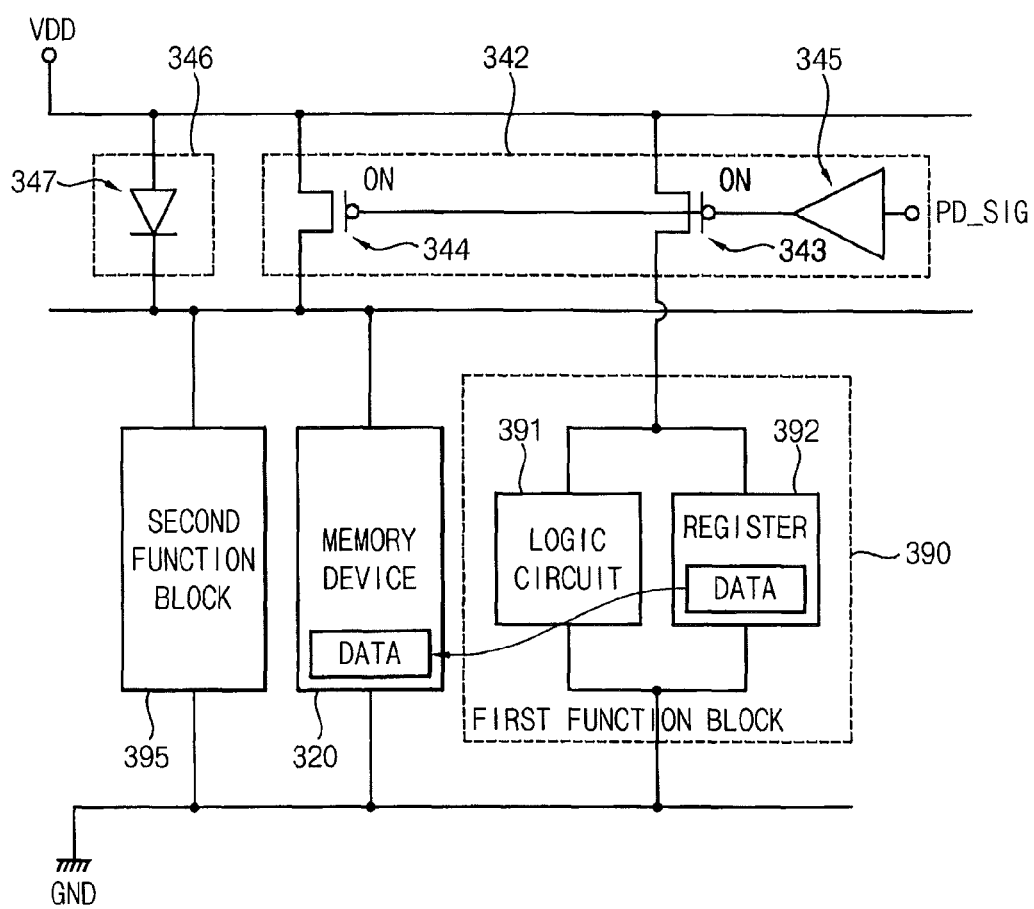

Referring to FIG. 9B, when the mode of the system is changed from the normal operation mode to the stand-by mode, the data DATA of the register 392 in the first function block 390 may be copied to the memory unit 320 before the mode of the system is changed from the normal operation mode to the stand-by mode. In an example embodiment, after the first interrupt signal IRT1 is generated responding to the activation of the mode change signal, the data DATA of the register 392 in the first function block 390 may be stored in the memory unit 320 based on the first interrupt signal IRT1.

Figure 9C:
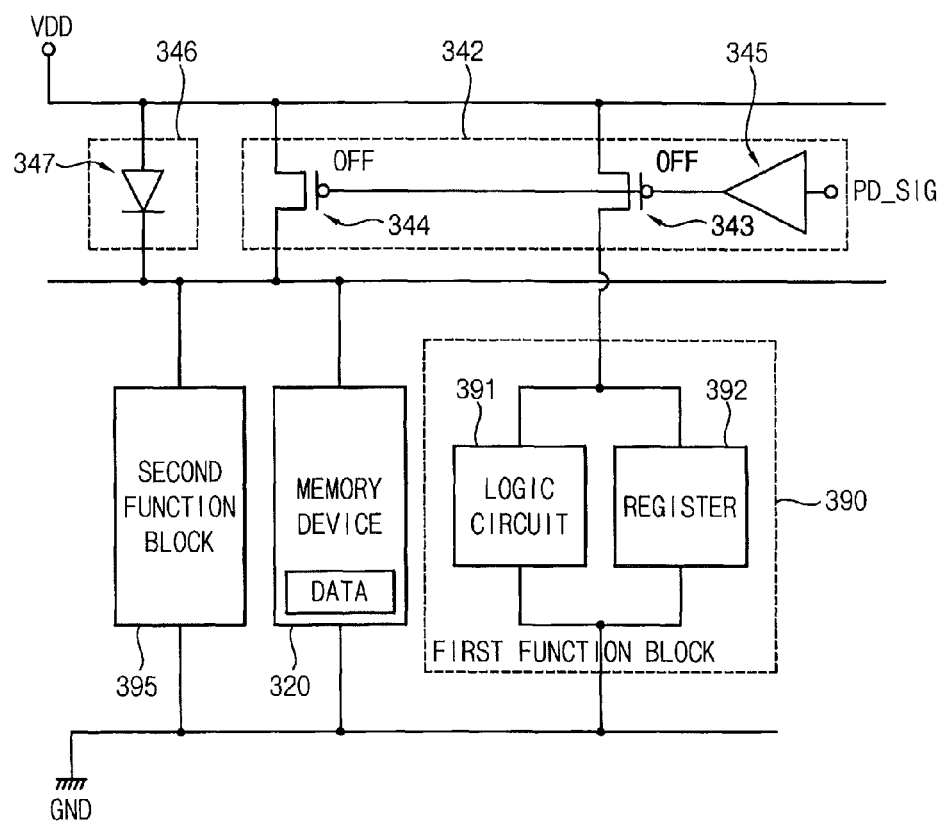

Referring to FIG. 9C, after the data DATA of the register 392 in the first function block 390 is stored in the memory unit 320, the power down signal PD_SIG may be activated to have a voltage level of logic "HIGH". Thus, the first switch 343 and the second switch 344 as the PMOS transistor receive a voltage level of logic "HIGH" such that the first switch 343 and the second switch 344 turn off based on the output of the amplifier 345. As a result, the first function block 390 and the second function block 395 are blocked from the normal operation power OP such that the system may operate in the stand-by mode. Here, the second function block 395 and the memory unit 320 may be provided with the stand-by power SP by the current limiter 346 coupled to the power voltage VDD. That is, the first function block 390 may be controlled to be in the power-off state in the stand-by mode because the first function block 390 is not provided with both the normal operation power OP and the stand-by power SP. The second function block 395 and the memory unit 320 may be controlled to be in the semi-power-off state because the second function block 395 and the memory unit 320 are provided with the stand-by power SP. Thus, the second function block 395 may retain the data of the second function block 395 in the stand-by mode because the second function block 395 operates based on the stand-by power SP. In addition, the memory unit 320 may retain the data DATA of the first function block 390 in the stand-by mode because the memory unit 320 operates based on the stand-by power SP.

Figure 9D:
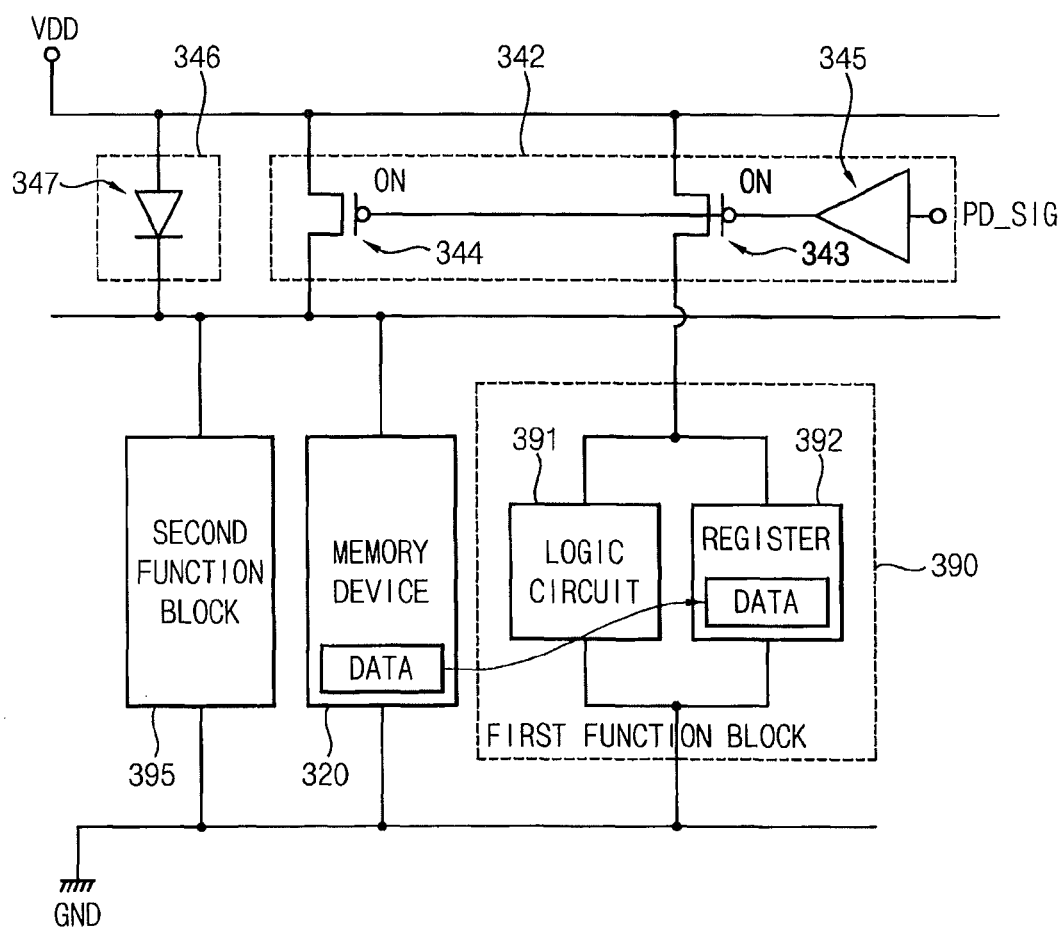

Referring to FIG. 9D, when the mode of the system is changed from the stand-by mode to the normal operation mode, the data DATA stored in the memory unit 320 may be restored to the first function block 390 (i.e., the register 392 of the first function block 390) after the mode of the system is changed from the stand-by mode to the normal operation mode. That is, the first switch 343 and the second switch 344 in the regulator 342 may turn on based on the output of the amplifier 345 because the power down signal PD_SIG is deactivated to have a voltage level of logic "LOW" responding to the deactivation of the mode change signal. Thus, the first function block 390 and the second function block 395 may be controlled to be in the power-on state because the first function block 390 and the second function block 395 are provided with the normal operation power OP corresponding to the power voltage VDD. After the second interrupt signal IRT2 is generated responding to the deactivation of the mode change signal, the data DATA stored in the memory unit 320 may be restored to the first function block 390 (i.e., the register 392 of the first function block 390) based on the second interrupt signal IRT2.

Figure 9E:
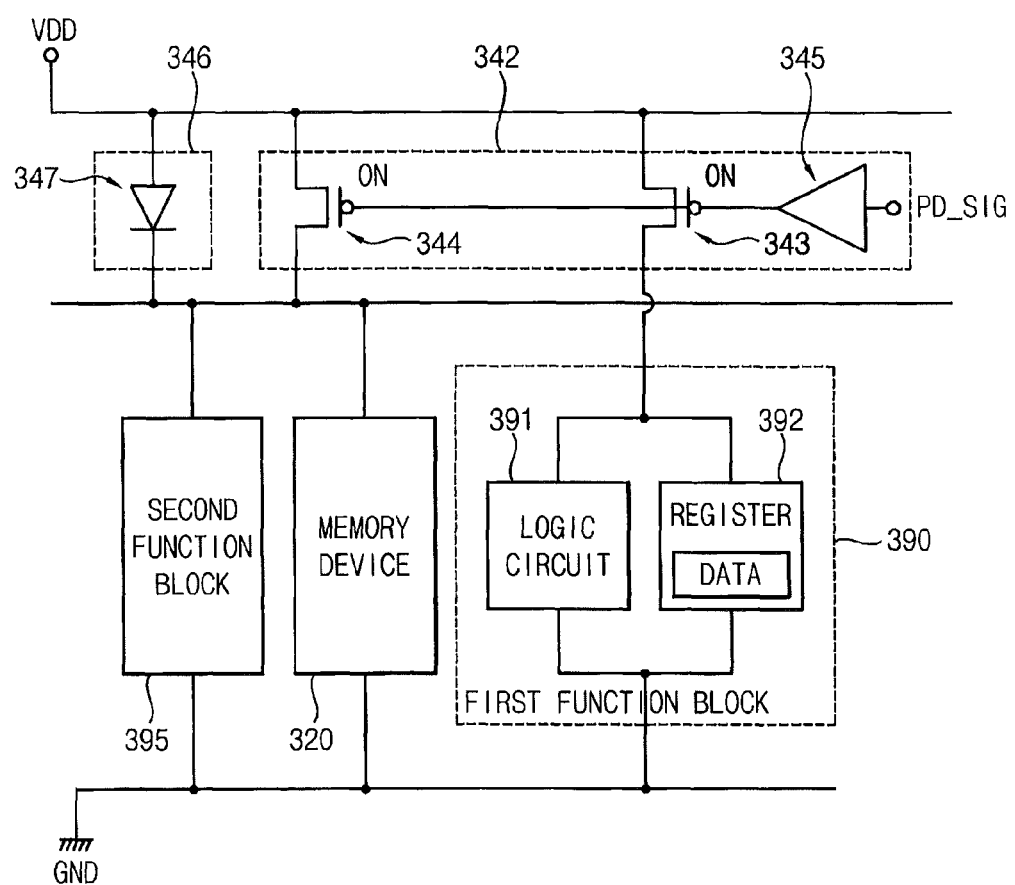

Referring to FIG. 9E, after the data DATA stored in the memory unit 320 is restored to the first function block 390 (i.e., the register 392 of the first function block 390), the data DATA stored in the memory unit 320 may be removed from the memory unit 320. However, in an example embodiment, the data DATA stored in the memory unit 320 may not be removed from the memory unit 320. In conclusion, although the mode of the system is changed between the normal operation mode and the stand-by mode, the first function block 390 and the second function block 395 may operate continuously even though the mode of the system is changed. As described above, the power gating device 300 may reduce power consumption of the first function block 390, the second function block 395, and the memory unit 320 in the stand-by mode, and may retain the data DATA of the first function block 390 and the data of the second function block 395 in the stand-by mode. Since the operation of the power gating device 300 illustrated in FIGS. 9A through 9E is an example embodiment, the operation of the power gating device 300 is not limited thereto. The present inventive concept may be applied to an electric device such as a desktop computer, a laptop computer, a digital camera, a cellular phone, a personal digital assistant (PDA), a portable multimedia player (PMP), a MP3 player, an image sensing system, a scanner, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A power gating device in a system including at least one function block, comprising:
a control unit configured to generate a first interrupt signal based on a mode change signal when a mode of the system is changed from a normal operation mode to a stand-by mode, and configured to generate a second interrupt signal based on the mode change signal when the mode of the system is changed from the stand-by mode to the normal operation mode;
a memory unit configured to store data of the function block based on the first interrupt signal, and configured to restore the stored data to the function block based on the second interrupt signal; and
a power source unit configured to provide a normal operation power to the function block and the memory unit based on a power down signal in the normal operation mode, and configured to provide a stand-by power to the memory unit based on the power down signal in the stand-by mode, wherein the power source unit provides the stand-by power to the memory unit during an activated period of the power down signal and the function block is controlled to be in a power-off state during the activated period of the power down signal, and the memory unit is controlled to be in a semi-power-off state during the activated period of the power down signal the power source further comprising:
a regulator configured to provide the normal operation power to the function block, a second function block, and the memory unit in the normal operation mode; and
a current limiter configured to provide the stand-by power to the second function block and the memory unit in the stand-by mode.

2. The power gating device of claim 1, wherein the system is implemented as a system-on-chip (SOC) system in which the power gating device and the function block are integrated.

3. The power gating device of claim 1, wherein the control unit generates the first interrupt signal responding to an activation of the mode change signal, and generates the second interrupt signal responding to a deactivation of the mode change signal.

4. The power gating device of claim 3, wherein the memory unit stores the data of the function block before the power down signal is activated when the mode of the system is changed from the normal operation mode to the stand-by mode.

5. The power gating device of claim 4, wherein the memory unit restores the stored data to the function block after the power down signal is deactivated when the mode of the system is changed from the stand-by mode to the normal operation mode.

6. The power gating device of claim 1, wherein the memory unit retains the stored data in the stand-by mode.

7. The power gating device of claim 5, wherein the power source unit provides the normal operation power to the function block and the memory unit during a deactivated period of the power down signal.

8. The power gating device of claim 7, wherein the function block is controlled to be in a power-on state during the deactivated period of the power down signal, and the memory unit is controlled to be in the power-on state during the deactivated period of the power down signal.

9. A power gating device in a system including a first function block and a second function block, comprising:
- a control unit configured to generate a first interrupt signal based on a mode change signal when a mode of the system is changed from a normal operation mode to a stand-by mode, and configured to generate a second interrupt signal based on the mode change signal when the mode of the system is changed from the stand-by mode to the normal operation mode;
- a memory unit configured to store data of a first function block based on the first interrupt signal, and configured to restore the stored data to the first function block based on the second interrupt signal; and
- a power source unit configured to provide a normal operation power to the first function block, a second function block, and the memory unit based on a power down signal in the normal operation mode, and configured to provide a stand-by power to the second function block and the memory unit based on the power down signal in the stand-by mode, wherein the power source unit provides the stand-by power to the second function block and the memory unit in the stand-by mode in response to an activation of the power down signal and controls the first function block to be in a power-off state during an activated period of the power down signal and controls the second function block to be in a semi-power-off state during the activated period of the power down signal, and the memory unit is controlled to be in the semi-power-off state during the activated period of the power down signal, wherein the power source unit comprises:
- a regulator configured to provide the normal operation power to the first function block, the second function block, and the memory unit in the normal operation mode; and
- a current limiter configured to provide the stand-by power to the second function block and the memory unit in the stand-by mode.

10. The power gating device of claim 9, wherein the regulator comprises:
- at least one first switch coupled between a power voltage and the first function block;
- at least one second switch coupled between the power voltage and the second function block; and
- an amplifier configured to turn on or off the first switch and the second switch based on the power down signal.

11. The power gating device of claim 10, wherein the control unit generates the first interrupt signal responding to the activation of the mode change signal, and generates the second interrupt signal responding to a deactivation of the mode change signal.

12. The power gating device of claim 11, wherein the memory unit stores the data of the first function block before the power down signal is activated when the mode of the system is changed from the normal operation mode to the stand-by mode, and
wherein the memory unit restores the stored data to the first function block after the power down signal is deactivated when the mode of the system is changed from the stand-by mode to the normal operation mode.

13. The power gating device of claim 9, wherein the second function block retains data of the second function block in the stand-by mode, and the memory unit retains the stored data in the stand-by mode.

14. The power gating device of claim 12, wherein the regulator provides the normal operation power to the first function block, the second function block, and the memory unit in the normal operation mode when the amplifier turns on the first switch and the second switch responding to a deactivation of the power down signal.

15. The power gating device of claim 14, wherein the first function block is controlled to be in a power-on state during the deactivated period of the power down signal, the second function block is controlled to be in the power-on state during the deactivated period of the power down signal, and the memory unit is controlled to be in the power-on state during the deactivated period of the power down signal.

* * * * *